Patented Dec. 29, 1936

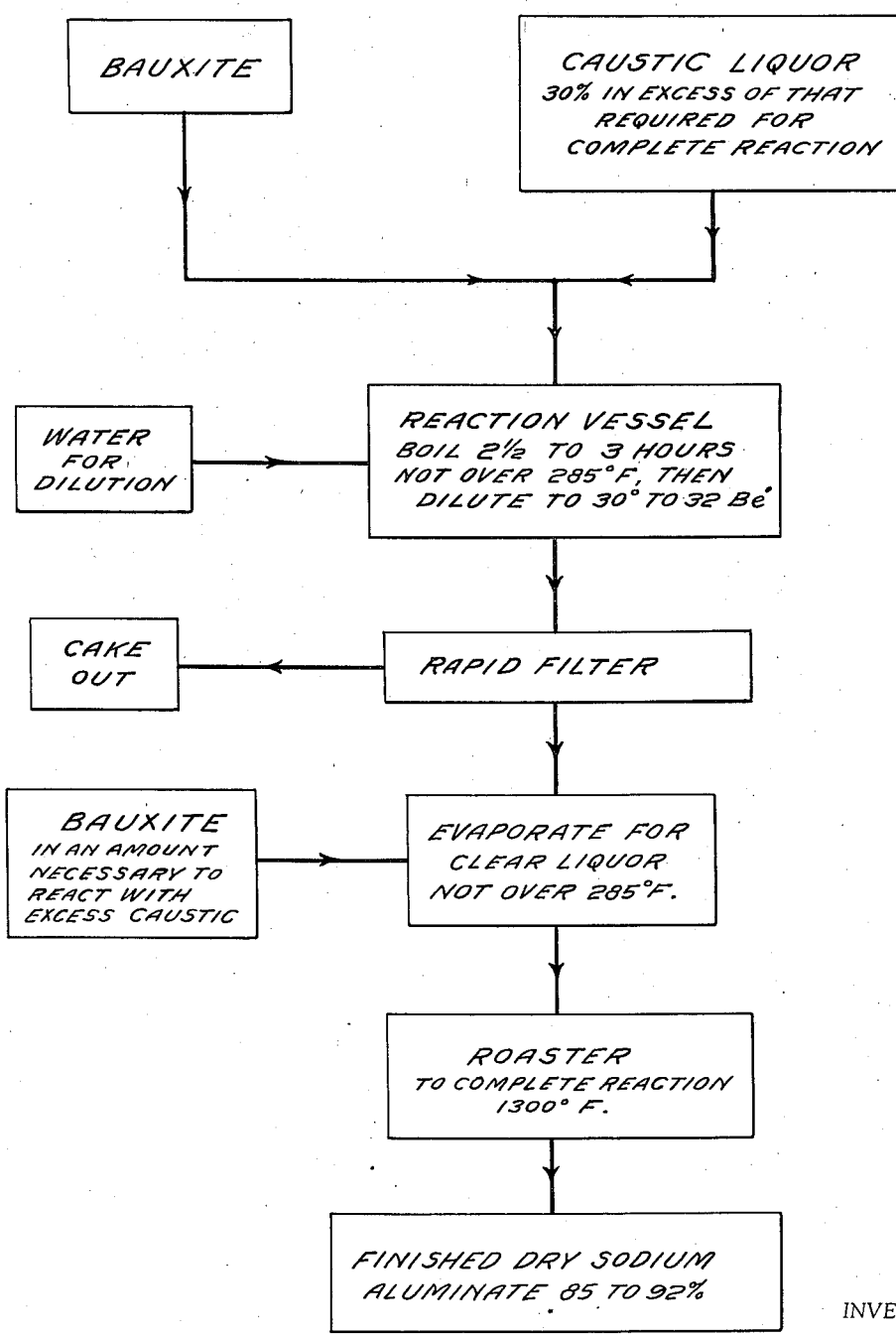

2,066,209

UNITED STATES PATENT OFFICE 2,066,209

SODIUM ALUMINATE

David Lurie, Joliet, Ill., assignor to American Cyanamid & Chemical Corporation, New York, N. Y., a corporation of Delaware Application October 17, 1934, Serial No. 748,599

11 Claims. (Cl. 23—52)

The present invention relates to a method of preparing solid sodium aluminate.

The principal object of the invention is to carry out such a method in a manner which will prevent hydrolysis and decomposition of the product while in a liquid state, and to carry out the process in such a manner that a minimum quantity of unreacted ingredients and/or impurities therein will remain in the final product.

Prior methods of producing liquid sodium aluminate consist in reacting bauxite with highly concentrated caustic soda solutions and separation of the liquid product from the so-called red mud by sedimentation and decantation. This process is open to the objection that it requires cumbersome equipment and that, due to the long periods of time required for such sedimentation and decantation, substantial decomposition occurs during this period.

Other objections to such prior processes reside in the fact that it has been customary heretofore to react a quantity of caustic soda solution with the full quantity of bauxite theoretically required to combine therewith as a single stage. Inasmuch as commercial bauxite contains a considerable quantity of silica and other insolubles, these impurities find their way into the final product with the result that such sodium aluminate is of a low grade, that is, lower than 85% and rather high in such impurities.

Prior methods of making solid sodium aluminate involved the roasting at high temperatures of a mixture of aluminum-bearing materials such as bauxite or aluminum hydrate and alkalies in the dry form. In these methods, calculated amounts of bauxite and alkali either in the form of caustic soda or soda ash are mixed and the mixture roasted for a certain period of time, the time and temperature depending upon the alkali used. When using soda ash, a higher temperature is used for the reaction than when using caustic soda. It will be evident from the nature of this process that all impurities and non-reactable ingredients contained in the bauxite, such as iron oxide, titanium oxide and silica, will find their way into the final product.

With the average grade of bauxite, it is impossible to produce by the above process material containing higher than 85% sodium aluminate, and in order to prepare such a product by that process, it is necessary to use exceptionally high grade bauxite, which is very scarce, and/or pure aluminum hydrate, which is expensive.

With the above as a back-ground, the present process has been designed to overcome these difficulties, to produce a grade of sodium aluminate containing from 85% to 95% of that material, low in impurities, without loss by decomposition or otherwise, so that a high degree of efficiency is obtained.

To this end, the invention contemplates a reaction between aluminum-bearing earths and caustic liquors by a two-stage process, that is, the quantity of caustic liquor in excess of that required to theoretically react with a quantity of aluminum-bearing earths is initially used and at the second stage, additional earth is added and the digestion and roasting continued to cause almost a complete reaction with the excess caustic. As a result of this two-stage operation, a more efficient reaction is obtained and the final product contains only those insolubles and unreacted earth solids which are contained in the second addition inasmuch as a filtering operation is used between the first and second reaction stages.

The invention also contemplates the further details hereinafter set forth.

Referring generally to the flow sheet accompanying this specification, an aluminum-bearing earth is digested with caustic liquor, the latter being used in an amount in excess of that required to theoretically react with the earth. Due to the high concentration of caustic liquor at this stage, there is a rapid and almost complete reaction with the earth.

After the digestion has been carried out for a requisite period of time, the reaction mixture is diluted with water and rapidly filtered in contradistinction to sedimentation and decantation. There is, consequently, only small opportunity for decomposition of the liquid sodium aluminate at this stage and any unreacted earth or insoluble impurities therein are removed as red mud.

The liquid product containing an excess amount of caustic then passes to an evaporator where a quantity of earth is added sufficient to react with the caustic. Here not only does evaporation take place but the reaction is further continued until the consistency of the batch reaches a desired point. The material is then transferred to a roaster where the reaction is completed and a dry product produced. It will be apparent, therefore, that due to the splitting up of the stages of reaction with an interposed filtering step, the final product contains only those solid unreacted and insoluble impurities therefrom contained in or by reason of the second earth addition. This makes for a high grade product containing minimum impurities.

A detailed method of operation will now be given but it is to be distinctly understood that this is by way of illustration and not limitation.

A thousand pounds of solid caustic soda may be dissolved in a thousand pounds of water (approximately 120 gallons), and after solution, the same run into the reaction vessel. While caustic soda has been mentioned as an example, obviously caustic potash or other equivalent caustic solution may be used. Fourteen hundred pounds of bauxite may now be added. The caustic liquor contains approximately 30% in excess of the amount required for theoretically complete reaction with the charge of bauxite. While a 50% caustic soda liquor is desirable, yet higher or lower concentration liquors may be used, depending upon circumstances. The charge in the reaction vessel may then be boiled at temperatures not over 285° F. and preferably between 250 and 270° F. After boiling from two and one-half to three hours, the charge is then diluted with water to a gravity of from 30 to 32° Bé. Ordinarily, approximately 300 gallons of water is required for this dilution. At this point, the batch is rapidly filtered to prevent any undue decomposition of the liquid sodium aluminate. A filter press has been found to be advantageous for the accomplishment of this separation. It will be observed that any unreacted solids or solid impurities such as silica will be removed with the cake of red mud, while the clear filtrate, still containing considerable quantities of excess alkali, is passed to the concentrator. At this point, enough bauxite is added to react with the excess of caustic present. With the above quantities used as an example, approximately 350 pounds will be required, although the exact amount to be added may be calculated from an analysis of the product at this stage.

The evaporator should not be operated at a temperature higher than 285° F., 280° F. being a desirable temperature. The material is evaporated to such a consistency where it will solidfy upon cooling. This is a difficult point to determine theoretically, but actual practice has found that from three to fours hours at this temperature will give the required consistency.

From the evaporator, the charge then passes to a roaster, where it remains for from 3 to 4 hours at a temperature of 1300° F. The above procedure will produce a substantially dry product from 85% to 92% sodium aluminate.

Proceeding according to the above and due to the much more efficient reaction, it has been able to cut the cost of raw materials as of the present time from $3.05 per hundred weight to $1.70, which is a considerable saving.

The present process makes possible the use of average grade bauxite for the production of sodium aluminate of the 90% to 92% grade, not thought to be possible heretofore.

A typical analysis of the final product follows:

|  | Per cent |
|---|---|
| Insoluble | 2.00 |
| Sodium aluminate | 91.00 |
| Sodium carbonate | 2.70 |
| Silica | 2.00 |
| Na2O combined with silica plus excess | 1.70 |
| Moisture and undetermined | .60 |

Where higher grades of solid sodium aluminate are desirable, aluminum hydrate may be used in the second stage instead of bauxite which obviously eliminates at that point the introduction of any impurities into the final product. A 95% solid sodium aluminate may be easily produced by this modification.

While in describing the above process, it has been found desirable to carry out the first stage reaction at atmospheric pressures, yet the use of autoclaves and pressures higher than atmospheric therein may be desirable in some instances to speed up the rate of reaction. The use of these higher temperatures, of course, will consequently reduce the time required at this stage.

While the invention has been shown and described with reference to particular embodiments, yet, obviously, I do not wish to be limited thereto but the invention is to be construed broadly and restricted only by the scope of the claims.

I claim:

1. A method of making sodium aluminate which includes the steps of digesting an aluminum-bearing earth with an amount of caustic liquor in excess of that theoretically necessary to react with the quantity of earth added, separating the solid residue from the liquid reaction product, adding an additional quantity of aluminum-bearing material uncombined with alkali metal to the liquid reaction product and subjecting the same to heat to cause further reaction between the aluminum-bearing material and the caustic and to remove water.

2. The method of claim 1 in which the digestion temperature is not substantially greater than 285° F.

3. The method of claim 1 in which the caustic liquor is an alkali metal hydroxide.

4. The method of claim 1 in which the caustic liquor is sodium hydroxide.

5. The method of claim 1 in which the excess of caustic liquor is 30%.

6. The method of claim 1 in which the second heat treatment stage includes evaporation of the liquid body followed by roasting of the evaporated mass.

7. The method of claim 1 in which the second heat treatment stage includes evaporation of the liquid body followed by roasting of the evaporated mass at substantially 1300° F.

8. The method of claim 1 in which the digestion period is substantially from two and one-half to three hours, the digestion product is then quickly diluted to from 30 to 32° Bé. prior to the separation step.

9. The method of claim 1 in which the digestion period is substantially from two and one-half to three hours, the digestion product is then quickly diluted to from 30 to 32° Bé. prior to the separation step, said separation step being rapid filtration.

10. The method of preparing solid sodium aluminate which consists in reacting a charge of bauxite with a 50% sodium hydroxide solution, the quantity of sodium hydroxide used being substantially 30% in excess of that required for complete reaction with the initial charge of bauxite, continuing the reaction by boiling from two and one-half to three hours at not over 285° F., quickly diluting the reaction product with water to from 30° to 32° Bé., rapidly filtering the mass, adding to the filtrate a quantity of bauxite sufficient to react with the excess caustic in the filtrate, evaporating the same to a consistency where the same will solidify upon cooling and then roasting the charge at substantially 1300° F.

11. The method of claim 1 in which the aluminum-bearing material at the second addition is a substantially pure aluminum hydroxide.

DAVID LURIE.